(12) United States Patent
Ringelhaan

(10) Patent No.: US 6,762,720 B1
(45) Date of Patent: Jul. 13, 2004

(54) SYSTEM AND METHOD OF DETERMINING A TEMPORAL POINT OF REFERENCE WHEN RECEIVING A RADIO SIGNAL

(75) Inventor: Otmar Ringelhaan, Greifenberg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/889,411
(22) PCT Filed: Jan. 11, 2000
(86) PCT No.: PCT/DE00/00074
§ 371 (c)(1), (2), (4) Date: Jul. 17, 2001
(87) PCT Pub. No.: WO00/42729
PCT Pub. Date: Jul. 20, 2000

(30) Foreign Application Priority Data

Jan. 18, 1999 (DE) .......................................... 199 01 754
Apr. 1, 1999 (DE) .......................................... 199 15 011

(51) Int. Cl.⁷ ................................................. G01S 1/24
(52) U.S. Cl. ....................................... 342/387; 342/385
(58) Field of Search ................................. 342/385, 387

(56) References Cited

U.S. PATENT DOCUMENTS 5,103,465 A 4/1992 Crisler et al.
5,140,617 A 8/1992 Kubo
5,450,395 A 9/1995 Hostetter et al.
5,598,427 A * 1/1997 Arthur et al. ................ 375/200

FOREIGN PATENT DOCUMENTS

| EP | 0 479 268 A2 | 4/1992 |
| WO | WO 97/24819 | 7/1997 |
| WO | WO 98/27684 | 6/1998 |

* cited by examiner

Primary Examiner—Theodore M. Blum
(74) Attorney, Agent, or Firm—Morrison & Foerster LLP

(57) ABSTRACT

A method and device for determining a temporal point of reference when receiving a radio signal, especially in a mobile radio system. The radio signal is received with a time-variant received strength in a temporally indeterminate manner. A received-strength determining unit determines the received strength as a function of the time of reception for a plurality of evaluation time intervals, a time base being defined repetitively for each of the evaluation time intervals. An averaging unit averages the received strength over the evaluation time intervals, the received strengths in each case resulting in a mean time-dependent received strength at identical times with respect to the individual time bases. A time-determining unit determines the temporal point of reference from the mean received strength as a function of time.

14 Claims, 2 Drawing Sheets

SYSTEM AND METHOD OF DETERMINING A TEMPORAL POINT OF REFERENCE WHEN RECEIVING A RADIO SIGNAL

CLAIM FOR PRIORITY

This application claims priority to International Application No. PCT/DE00/00074 which was published in the German language on Jul. 20, 2000.

TECHNICAL FIELD OF THE INVENTION

The invention relates to a method and a device for determining a temporal reference point when receiving a radio signal, and in particular, to determining a temporal reference point in a mobile radio system, the radio signal being received with a time-variant received strength in a temporally indeterminate manner.

BACKGROUND OF THE INVENTION

Conventionally, transmitting communication information via radio channels in radio communication systems or in radio systems is well known, respectively. In a special radio system, a mobile radio system according to the GSM (Global System for Mobile Communication) standard, the information transmitted during the radio transmission is transmitted clustered in the form of so-called bursts. Each information burst has 142 binary symbols to be evaluated, of which normally the center 26 symbols in each case represent the so-called training sequence or midamble, respectively. The training sequence includes transmission information known to the receiver. The training sequence is usually used by the receiving station for determining the respective transmission conditions during the radio transmission and, respectively, eliminating disturbing influences of unfavorable transmission conditions. This makes it possible to correct the actual transmitted information which, for example, is received distorted by linear distortion or dispersion.

It is well known that the radio signal is distorted to a greater or lesser extent depending on the type of terrain or space between the transmitter and the receiver of a radio signal. In particular, multipath propagation occurs, i.e. the transmitted radio signal is reflected, for example from houses, hills or other forms of terrain and reaches the receiver over a number of paths with different delay times. The result is a temporally indeterminate received signal. Furthermore, the individual parts of the received radio signal are received with different received strength. Received strength is understood to be any suitable measure for the strength of the received radio signal, for example the received strength, the amplitude of the received field strength or the signal-to-noise ratio. Another possible cause for the difference between the received radio signal and the transmitted radio signal are interference signals which are received via the same receiving device.

It is also known to transmit to the receiver, at the beginning or repeatedly at relatively great intervals during the radio transmission, special radio information. The radio information allows the receiver to draw conclusions about the respective time at which the training sequence of future received bursts can be expected in each case. The transmission and evaluation of this special radio information which is transmitted, for example, in special bursts, is not without errors since the successive bursts do not arrive at precisely equidistant time intervals at the receiver. Additionally, the incoming radio signals are received in a temporally indeterminate manner as has already been explained, and a time window for receiving the expected training sequence, which is wider than the length of the training sequence, is usually established for each burst in the receiver. An evaluating device in the receiver outputs an output signal at least within the period in which the reception of the training sequence is expected. Since the radio signal and especially the training sequence is received in a temporally indeterminate manner, the output signal, especially the received strength averaged over the length of a training sequence, is, accordingly, output not only for a particular time but for a particular period.

Such an evaluation of the received radio signal for the purpose of correction or for other purposes, as described above, can take place analogously in any radio system in which the transmitted radio information itself includes reference points for the evaluation which can be evaluated. Apart from the evaluation of training sequences, the redundancy of received radio information, which is known in the receiver, can also be used for this purpose, for example. Training sequences are, therefore, not absolutely necessary.

A radio system of another type in accordance with the GSM standard, in which training sequences and/or redundant transmission information can be analogously evaluated is, for example, the future UMTS (Universal Mobile Telecommunication System). Both in GSM and in UMTS, discrete information, i.e. digital data, is transmitted. However, a corresponding evaluation of information known in the receiver is also possible in other systems.

It has already been proposed, for different reasons, to attempt to determine a temporal point of reference in the receiver in the case of a radio signal which has been received in a temporally indeterminate manner. A possibility of using the information thus obtained includes determining the local position of a mobile station in a mobile radio system. It has already been proposed for this purpose to determine the position of the mobile station from a plurality of radio signals, which are transmitted by different mutually distant base stations to the mobile station. However, this presupposes that the mobile radio system contains a defined timing pattern, i.e. at least the time difference of the transmitting times is known in the individual base stations. An attempted spatial resolution of 125 m corresponds to a temporal resolution of the received radio signals of about 400 ns. In the case of GSM, this corresponds to about ⅛ of one bit period, i.e. the reciprocal value of the transmission rate at which the individual bits are transmitted. Instead of evaluating radio signals on the base station—mobile station links (downlink), radio signals of uplinks can also be evaluated.

As already described above, it is known to use in the evaluation of training sequences an evaluating device, especially a correlator which outputs an output signal. The output signal includes, in particular, of the received power, in each case calculated from samples over a time interval having the length of one training sequence. Since the training sequence is received in a temporally indeterminate manner owing to, among other things, the different delay times of the individual signal components of the radio signal, the output signal, in this case the received power, is also temporally indeterminate. It has already been proposed to determine the power centroid of the received power individually for each burst to determine a temporal point of reference. In this case, the definition of the power centroid corresponds to the definition of a mass centroid.

It has also been proposed to determine the temporal point of reference from the component of the radio channel which corresponds to a propagation of the radio signal over the direct path between transmitter and receiver. However, the component of the direct path can frequently only be determined with difficulty, depending on the terrain between the transmitter and the receiver. In cities, in particular, there is frequently no propagation of the radio signal over the direct path at all.

SUMMARY OF THE INVENTION

In one embodiment of the invention, there is a method for determining a temporal point of reference when receiving a radio signal, the radio signal being received in a temporally indeterminate manner with a time-variant received strength, determining the received strength of the received radio signal as a function of a time of reception in each case for a plurality of evaluation time intervals, a time base being defined repetitively for each of the evaluation time intervals; averaging the received strength over the plurality of evaluation time intervals, the received strengths in each case resulting in a mean time-dependent received strength with respect to individual time bases; and determining the temporal point of reference from the mean time-dependent received strength as a function of time with respect to the repetitive time base.

In one aspect of the invention, the temporal point of reference is defined as the time of a peak of the mean received strength.

In another aspect of the invention, the radio signal having repetitive training sequences with known signal data, wherein in each of the evaluation time intervals, at least a part of one or more of the training sequences is received in the temporally indeterminate manner.

In still another aspect of the invention, the training sequences are in each case expected in at least one repetitive expected-time windows and the received radio signal is evaluated within the expected-time windows so that the transmitted transmission information can then be corrected, such that the evaluation time intervals are within the expected-time windows and coincide with the latter.

In yet another aspect of the invention, the temporal position of the expected-time windows is specified in dependence on the temporal point of reference determined.

In another aspect of the invention, determining the local position of a receiving station for receiving the radio signals, in which a plurality of the temporally indeterminate radio signals is received by different transmitting stations, sending out the radio signals from the transmitting stations at transmitting times, the transmitting-time difference of which is known or determined in the receiving station; and determining the temporal point of reference of the temporally indeterminate radio signals and deriving information on the position of the receiving station based on the determination.

In still another aspect of the invention, before the temporal point of reference is determined, the temporal resolution of the received strength and/or of the mean time-dependent received strength is increased by interpolation.

In another embodiment of the invention, there is a receiving device to receive a temporally indeterminate radio signal with a time-variant received strength; and an evaluating device to determine a temporal point of reference of the received temporally indeterminate radio signal, wherein the evaluating device includes: a received-strength-determining unit to determine the received strength as a function of the time of reception for a plurality of evaluation time intervals, a time base being defined repetitively for each of the evaluation time intervals, an averaging unit to average the received strength over the evaluation time intervals, the received strengths resulting in a mean time-dependent received strength at identical times with respect to the individual time bases; and a time-determining unit to determine the temporal point of reference from the mean received strength as a function of time.

In one aspect of the invention, an interpolation unit to interpolate the received strength as a function of the time of reception and/or the mean time-dependent received strength as a function of time.

In another aspect of the invention, the interpolation unit has a transversal filter.

In still another aspect of the invention, the transversal filter approximately corresponds to an ideal low-pass filter, the cut-off frequency of which is half the bit rate of a digital received signal of the device.

In yet another aspect of the invention, the averaging unit has a plurality of averaging filters, in which the averaging filters process the received strengths at identical times of the evaluation time intervals which are allocated to the averaging filter, and the averaging filters are preceded by a distributor unit to distribute the received-strength values to the respective associated averaging filters.

In another aspect of the invention, the averaging filters are first-order low-pass filters.

In yet another aspect of the invention, the device is a mobile station or base station for a mobile radio system.

DETAILED DESCRIPTION OF THE PREFERRED EMBODIMENTS

Figure 1:
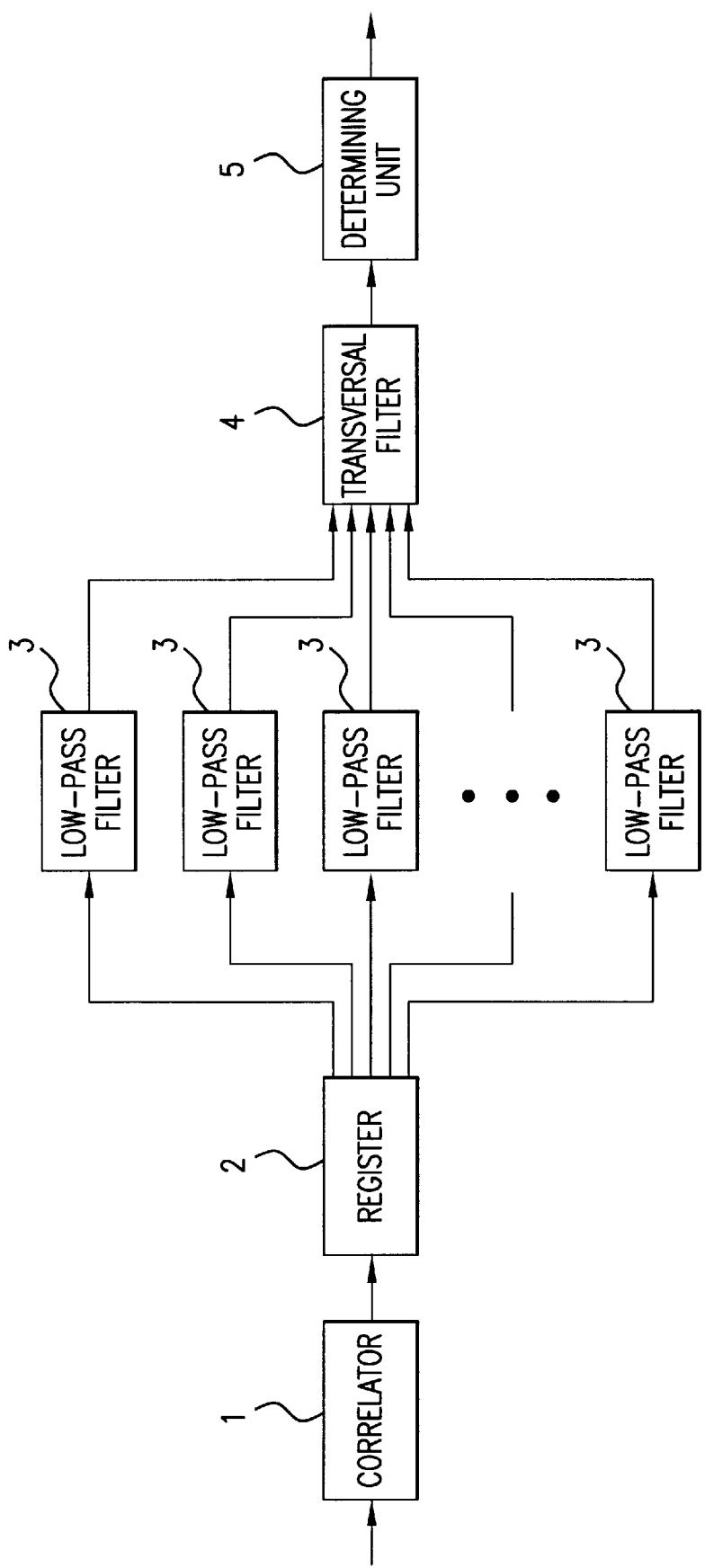
FIG. 1 shows an embodiment of a device for determining a temporal point of reference of a radio signal received in a temporally indeterminate manner.

The invention discloses a method and a device for determining a temporal point of reference when receiving a radio signal of the type initially mentioned so that the temporal point of reference can be determined reliably.

In the method according to the invention, the received strength of the received radio signal is determined as a function of the time of reception in each case for a plurality of evaluation time intervals. A time base is defined repetitively for each of the evaluation time intervals, such that the received strength is averaged over the evaluation time intervals, the received strengths in each case resulting in a mean time-dependent received power with respect to the individual time bases, and the temporal point of reference is determined from the mean received strength as a function of time with respect to the repetitive time base. In particular, as is known from the prior art, a value of the received strength is determined in each case from a number of samples of the radio signal which correspond to a subinterval within the evaluation time interval during the determination of the received strength as a function of the time of reception.

The received strength is averaged over a plurality of evaluation time intervals before the temporal point of reference is determined as a function of time from the mean received strength. Averaging increases the reliability of the determination of the point of reference as is confirmed by first experimental results. This is presumably due to the fact that components of the radio signal which correspond to particular propagation paths are subject to great temporal fluctuations. This finds expression in the fact that the received strength fluctuates temporally, or changes with time, respectively, as a function of the time of reception for each individual evaluation time interval. For this reason, a random time of reception can be determined from a single evaluation time interval, depending on the random instantaneous transmission situation of the radio signal. An additional aggravating factor is that these fluctuating components can have a high received strength. This results, for example, in a functional contour of the received strength which corresponds to the profile of a mountain with a flattened peak for a single evaluation time interval. Since the time-variant components of the radio signal, however, are not constant in time, their received strength is not of importance owing to the averaging. In contrast, the components of the radio signal which are stable in time have great importance. These are frequently components with a high received strength so that the time of reception is then preferably defined as the time at which the mean received strength is at its absolute maximum.

In particular, the averaging is performed in a sliding manner over (in each case) a fixed number of evaluation time intervals which, in particular, follow one another at constant time intervals (in each case). However, the evaluation time intervals can also be at irregular intervals from one another. Furthermore, the individual evaluation time intervals do not need to be of equal length, either. In a digital evaluation of the respective received strength as a function of time, however, evaluation time intervals of equal length are preferred, in particular.

In a radio system with digital information transmission (for instance the GSM), in which the radio signal repetitively has training sequences with known signal data, at least a part of one or of a number of the training sequences is received preferably in a temporally indeterminate manner in each of the evaluation time intervals. In particular, if all individual training sequences include the same data sequences, the variability of the pulse response of the training sequences is based on temporal variations of the transmission conditions but not on fluctuations which are based on an altered data sequence.

The evaluation time intervals are preferably located within the expected-time windows and, in particular, coincide with the latter if the training sequences are (in each case) expected in one of a number of repetitive expected-time windows, and if the radio signal is evaluated within the expected-time windows in order to be able to correct the transmitted transmission information.

Another embodiment of the method is used for positioning expected-time windows in time. In this embodiment, the fact that the temporal position of the expected-time windows is specified based on the temporal point of reference determined. An advantage of this embodiment lies in the fact that expected-time windows can be reliably positioned in time for future evaluation time intervals. The basis for the temporal positioning is the actual point of reference determined. In particular, the point of reference can be repetitively determined, and in each case a new positioning of the future expected-time windows or a correction of the positioning already in existence can be carried out. The transmission of special bursts which do not contain any communication data in the actual sense can, therefore, be omitted and/or reduced to the number absolutely necessary. For example, it may be sufficient to transmit a single such burst only at the beginning, i.e. when a communication link is set up. Thus, more transmitting time is available for transmitting the actual communication information and/or the band width of the frequency band used during the radio transmission can be reduced.

In another embodiment of the method, the local position of a receiving station for receiving radio signals, especially the local position of a mobile station in a mobile radio system is determined. In this method, a plurality of temporally indeterminate radio signals which are transmitted by various transmitting stations is received, the transmitting stations sending out the radio signals in each case at transmitting times the transmitting time difference of which is known in the receiving station or can be established there. For each of the temporally indeterminate radio signals, the temporal point of reference is determined and from this, information on the position of the receiving station is derived.

In another embodiment of the method, the temporal resolution of the received strength and/or of the mean received strength is increased by interpolation before the temporal point of reference is determined. The interpolation is preferably performed after the averaging of the received strength over the evaluation time intervals. In particular, the temporal resolution corresponding to the distances between the individual received bits is not sufficient for determining the local position of a receiving station in a radio system according to the GSM standard. In this case, the interpolation provides for a determination of the temporal point of reference which is of sufficient accuracy and reliability for a satisfactory local resolution of the position of the receiving station. However, interpolation also makes sense for other applications, particularly for the temporal positioning of expected-time windows.

The device according to the invention, has a receiving device for receiving a temporally indeterminate radio signal having a time-variant received strength. Furthermore, an evaluating device for determining a temporal point of reference of the received radio signal is provided. The evaluation device has a received-strength-determining unit for determining the received strength as a function of the time of reception for a plurality of evaluation time intervals, a time base being defined repetitively for each of the evaluation time intervals. Furthermore, the evaluation device has an averaging unit for averaging the received strength over the evaluation time intervals. The received strength, in each case, resulting in a mean time-dependent received strength at the same time with respect to the individual time bases. Additionally, the evaluation device has a time-determining unit for determining the temporal point of reference from the mean received strength as a function of time.

In addition, an interpolation unit for interpolating the received strength as a function of the time of reception and/or the mean received strength as a function of time is preferably provided. In particular, the interpolation unit has a transversal filter. In one aspect, the transversal filter approximately corresponds to an ideal low-pass filter, the cut-off frequency of which is half the bit rate of a digital received signal. In this manner, the input signals of the transversal filter generate output signals which do not interfere with one another at the nodes of the interpolation, i.e. at the nodes, the correct unchanged value of the received strength is obtained by the interpolation.

In another embodiment of the device according to the invention, the averaging unit exhibits a plurality of averaging filters, the averaging filters preferably constructed as digital low-pass filters. In each case, the filters processing the input strengths which correspond to associated, in each case, equal times of the evaluation time intervals. The averaging filters are preceded by a distributor unit for distributing the received-strength values to the respective associated averaging filter. The averaging filters are, in particular, first-order low-pass filters.

Digital low-pass filters, in particular, can be implemented at low costs today. Furthermore, the filter characteristic of digital filters can be predetermined and implemented in an almost freely selectable manner.

The invention will now be explained in greater detail with reference to exemplary embodiments, referring to the attached drawing.

However, the invention is not restricted to the exemplary embodiments and, in particular, not to radio systems in accordance with the GSM standard.

FIG. 1 shows important components of a device for determining a defined time of reception of a radio signal received in a temporally indeterminate manner in a radio system according to the GSM standard. The received radio signal is present at the input of a correlator 1. The correlator 1 has a shift register which contains 26 individual storage locations. The shift register works in synchronism with the bit rate of the received signal, i.e. at a bit rate of about 271 kHz, a complex value is entered in the first one of the 26 storage locations approximately every 3.7 $\mu$s. Correspondingly, the previous values of the $1^{st}$ to $25^{th}$ storage location are simultaneously transferred into the respective storage location having the next higher ordinal number. The complex value in the $26^{th}$ storage location is removed from the shift register.

From the complex values, the correlator 1 calculates the received power which thus corresponds to the received power of one time interval which has the length of a training sequence or, respectively, midamble. Since this is well known, reference is made to the relevant prior art with regard to details. The received power calculated is then output as an output signal of the correlator 1 in the direction of a second shift register 2.

Figure 2:
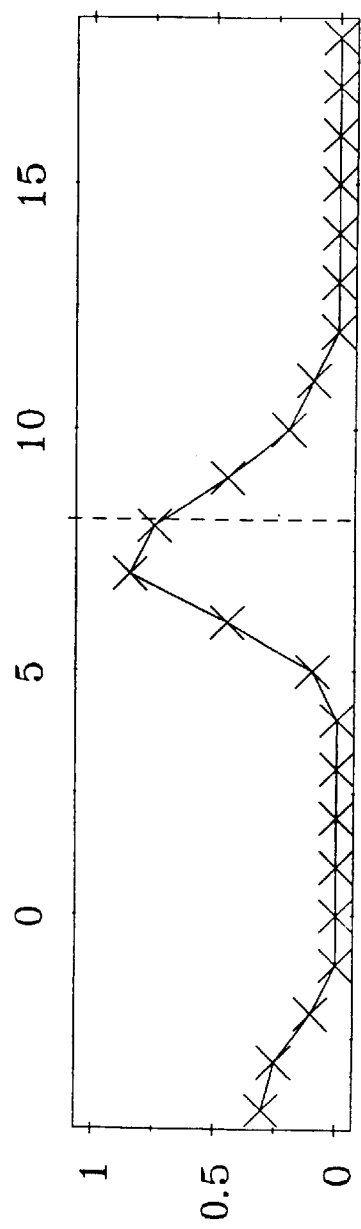
FIG. 2 shows the received strength as a function of the time of reception at the output of a correlator of the device shown in FIG. 1.

FIG. 2 shows the received power as a function of time by way of a section of a burst. Time is plotted along the abscissa, and the received power is plotted in arbitrary units of 0 to 1 along the ordinate. Since the device operates synchronously with the bit rate, one unit along the abscissa corresponds to the distance between two bits, i.e. about 3.7 $\mu$s. Each time, in turn, corresponds to a state of the first shift register in the correlator 1 with the corresponding occupancy of the 26 storage locations. Twenty-three such times of a burst are shown by crosses in FIG. 2.

In the device shown partially in FIG. 1, an expected-time window is provided in which the reception of the midamble is expected. The expected-time window is repetitively positioned for each burst in such a manner that the maximum received power of the expected midamble received in a temporally indeterminate manner is approximately in the center of the expected-time window. The expected-time window has been selected to be of such widths, in particular, due to possible delay differences of the individual components of a radio signal. For example, due to multipath propagation. Thus, a total of 42 samples are taken into consideration, 16 more than correspond to one midamble. At the same time, the 42 samples are also the basis for correcting the radio signal. The origin of the diagrams in FIG. 2 to FIG. 4 has been placed in such a manner that its time component coincides with the beginning of the expected-time window or, respectively, the averaged expected-time window (see below). Consequently, the expected-time window in each case includes the output signals of correlator 1 at times 0 to 15. The expected-time window is used as filter for the output signal of correlator 1 for each individual burst in the following manner.

The expected-time window is used as filter for the output signal of correlator 1 for each individual burst in the following manner.

The output signal of the correlator 1 is input into the second shift register 2 which has 16 individual registers. The second shift register 2 is read out at a time at which the 16 successive output signal values of the correlator 1, the associated times of which are within the expected-time window, are entered in the second shift register 2. Each one of the 16 register values is output via a separate output of the second shift register 2.

Each of the 16 separate outputs of the second shift register 2 is connected to a low-pass filter 3. The expected-time windows of successive bursts are normally spaced at temporally constant intervals. The total number of 16 low-pass filters 3, which represent first-order low-pass filters, therefore, act in such a manner that in each case a mean value of the received power is present at their output at a time of an averaging expected-time window. In each case, the averaging performed by a single low-pass filter 3 thus includes the received power values which are associated with the mutually corresponding times in successive expected-time windows, provided the time interval between the expected-time windows is constant. The low-pass filters 3 preferably have in each case a transfer characteristic according to the following rule $$u_a = u_e + u_m \cdot 15/16,$$

where $u_m$ is a current mean output value present at the output of low-pass filter 3 at a given time, $u_e$ is a new input value of low-pass filter 3 and $u_a$ is the new output value of low-pass filter 3 formed from the new input value and the previously current output value.

For the interpolation, i.e. for increasing the number of nodes in the averaging expected-time window, the output signals of the sixteen low-pass filters 3 are successively input, at time intervals corresponding to the bit rate, into a transversal filter 4 which approximately corresponds to an ideal low-pass filter having a cut-off frequency which is equal to half the bit rate. The transversal filter 4 operates at a clock rate corresponding to the desired resolution, which is higher than the bit rate, for example at 8-times the bit rate. To supplement the missing input values of the transversal filter 4 corresponding to the low bit rate, 0 values are in each case input into the transversal filter 4. In an alternative embodiment, the output signals of the low-pass filters 3 are in each case input identically as often as required. This embodiment is equivalent to the one described above, especially if the overall arrangement again acts as an ideal low-pass filter.

Figure 3:
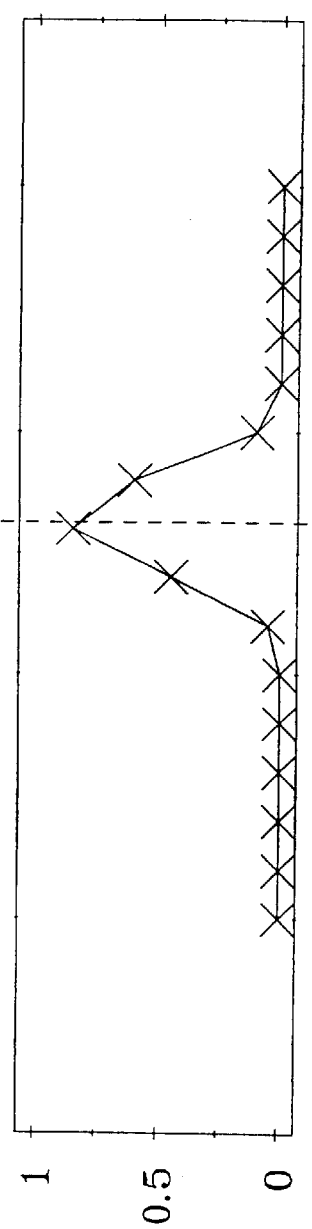
FIG. 3 shows the received strength as a function of time after it has been averaged over a plurality of evaluation-time intervals.

The total input signal of the transversal filter 4, which has 16 individual values or nodes, respectively, is shown in FIG. 3. The averaging expected-time window is plotted along the abscissa with values from 0 to 15. The crosses correspond to the mean values calculated by the low-pass filters 3. As can be clearly seen, the characteristic of the received power as a function of time has changed owing to the averaging over a plurality of expected-time windows. FIG. 2 only shows the characteristic for a single burst. The peak of the received power is approximately at time 7. However, the radio signal component or components leading to the peak are components having a short life which have little influence on the result of the averaging during the averaging. As is also shown by the characteristic in FIG. 3, the short-lived components are scattered about the medium- or long-term peak which is located at time 8. The characteristic shown in FIG. 3, however, is based on a small number of nodes so that the actual peak cannot be detected accurately.

Figure 4:
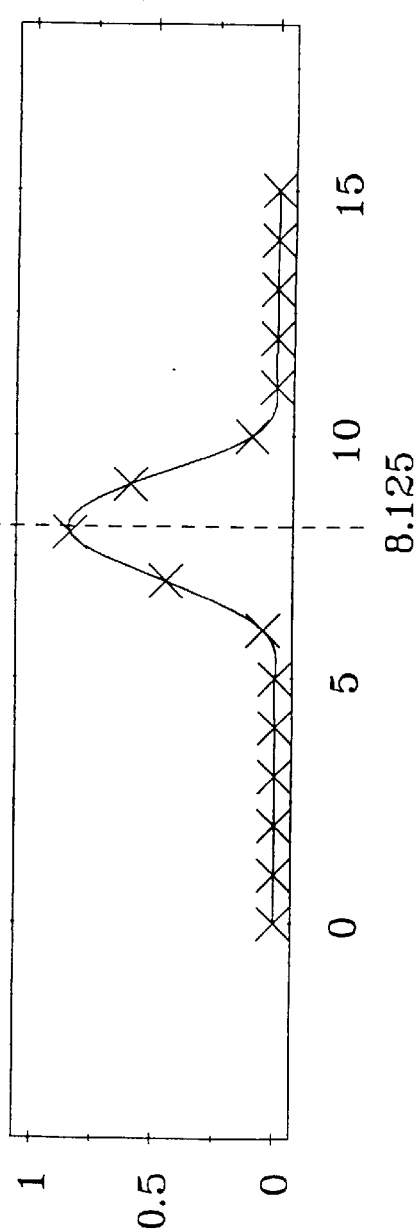
FIG. 4 shows the mean received strength as a function of time after intermediate values have been determined by interpolation.

The output signal of the transversal filter 4 is the sampling contour shown in FIG. 4, in which the nodes existing before the interpolation are shown for the sake of clarity. The interpolation produced eight times the number of nodes. The peak of the characteristic shown in FIG. 4 is at time 8.125.

In the present case, the temporal point of reference to be determined is defined as the time of the peak of the mean received power. This time is determined in the determining unit 5 which receives the output signal of the transversal filter 4. The value 8.125 determined for the temporal point of reference is available as output signal of the determining unit 5.

Using the length of a burst, which is known in the receiver, the position of the expected-time window for evaluating future bursts is checked and, if necessary, corrected. However, attention should be paid to the fact that the time base for evaluating the received power as a function of time in the individual bursts is not shifted during the averaging of the received power over a number of bursts. Otherwise, a virtual self-adjustment of the expected-time window would take place which masks any drifting of the received-power peak actually taking place in the expected-time window. Depending on the purpose of the determination of the defined time of reception, however, it is quite desirable, as a rule, to detect such a drift, for example for determining a change in the delay difference between two radio signals received in a temporally indeterminate manner from different base stations. However, such a drift, the cause of which has been found to be, for instance, the detuning of the synchronization between different transmitting and receiving stations can naturally be corrected deliberately.

In the present case, there is no correction of the position since the temporal point of reference is approximately in the center of the expected-time window.

Trials with the method according to the invention, which was carried out in the manner described above with the device represented in FIG. 1, have shown that the temporal point of reference can be reliably determined independently of the type of terrain between the transmitter and the receiver of the radio signal. Using the low-pass transfer function described above, averaging over 1000 successive expected-time windows and with a signal/noise ratio of 9 dB, the following values of the dispersion σ were determined, the values of σ being expressed in multiples of one eighth of a bit period:

σ=0.00 for a rural area in which the transmission between transmitter and receiver takes place, and for a relative speed between transmitter and receiver of 250 km/h, σ=1.67 for typically urban terrain and for a relative speed of 3 km/h, σ=0.68 for typically urban terrain and for a relative speed of 50 km/h, and σ=0.00 for hilly terrain and for a relative speed of 100 km/h.

As is proven by the two trials with different relative speeds between transmitter and receiver in typically urban terrain, the temporal point of reference can be determined even more precisely at higher relative speeds. This is presumably due to the fact that the radio signal components which are far distant in time from the peak of the received power become more short lived with increasing speed from the point of view of the receiver so that the definition of the distribution around the peak increases. Should the relative speed between transmitter and receiver not be sufficient for suppressing secondary components of the radio signal during the averaging of the received power in difficult terrain, it is proposed to eliminate these components by the frequency-changing method generally known as frequency hopping and averaging over an averaging time which is sufficiently long for covering the frequency range within which the individual evaluation time intervals are distributed.

What is claimed is:

1. A method for determining a temporal point of reference when receiving a radio signal, the radio signal being received in a temporally indeterminate manner with a time-variant received strength, comprising:

determining the received strength of the received radio signal as a function of a time of reception in each case for a plurality of evaluation time intervals, a time base being defined repetitively for each of the evaluation time intervals;

averaging the received strength over the plurality of evaluation time intervals, the received strengths in each case resulting in a mean time-dependent received strength with respect to individual time bases; and determining the temporal point of reference from the mean time-dependent received strength as a function of time with respect to the repetitive time base.

2. The method as claimed in claim 1, wherein the temporal point of reference is defined as the time of a peak of the mean received strength.

3. The method as claimed in claim 1, the radio signal having repetitive training sequences with known signal data, wherein in each of the evaluation time intervals, at least a part of one or more of the training sequences is received in the temporally indeterminate manner.

4. The method as claimed in claim 3, in which the training sequences are in each case expected in at least one repetitive expected-time windows and the received radio signal is evaluated within the expected-time windows so that the transmitted transmission information can then be corrected, such that the evaluation time intervals are within the expected-time windows and coincide with the latter.

5. The method as claimed in claim 4, wherein the temporal position of the expected-time windows is specified in dependence on the temporal point of reference determined.

6. The method as claimed in claim 1, further comprising:

determining the local position of a receiving station for receiving the radio signals, in which a plurality of the temporally indeterminate radio signals is received by different transmitting stations;

sending out the radio signals from the transmitting stations at transmitting times, the transmitting-time difference of which is known or determined in the receiving station; and determining the temporal point of reference of the temporally indeterminate radio signals and deriving information on the position of the receiving station based on the determination.

7. The method as claimed in claim 1, wherein before the temporal point of reference is determined, the temporal resolution of the received strength and/or of the mean time-dependent received strength is increased by interpolation.

8. A device comprising:

a receiving device to receive a temporally indeterminate radio signal with a time-variant received strength; and an evaluating device to determine a temporal point of reference of the received temporally indeterminate radio signal, wherein the evaluating device includes:

a received-strength-determining unit to determine the received strength as a function of the time of reception for a plurality of evaluation time intervals, a time base being defined repetitively for each of the evaluation time intervals;

an averaging unit to average the received strength over the evaluation time intervals, the received strengths resulting in a mean time-dependent received strength at identical times with respect to the individual time bases; and a time-determining unit to determine the temporal point of reference from the mean received strength as a function of time.

9. The device as claimed in claim 8, further comprising an interpolation unit to interpolate the received strength as a function of the time of reception and/or the mean time-dependent received strength as a function of time.

10. The device as claimed in claim 9, wherein the interpolation unit has a transversal filter.

11. The device as claimed in claim 10, wherein the transversal filter approximately corresponds to an ideal low-pass filter, the cut-off frequency of which is half the bit rate of a digital received signal of the device.

12. The device as claimed in claim 8, wherein the averaging unit has a plurality of averaging filters, in which the averaging filters process the received strengths at identical times of the evaluation time intervals which are allocated to the averaging filter, and the averaging filters are preceded by a distributor unit to distribute the received-strength values to the respective associated averaging filters.

13. The device as claimed in claim 12, wherein the averaging filters are first-order low-pass filters.

14. The device of claim 8, wherein the device is a mobile station or base station for a mobile radio system.

* * * * *